June 18, 1968  J. D. EVANS  3,388,523

VEHICLE TRIM STRIP WITH BUMPER INSERT

Filed May 29, 1967

James D. Evans
INVENTOR.

BY *Clarence A. O'Brien*
*and Harvey B. Jacobson*
Attorneys

United States Patent Office 3,388,523
Patented June 18, 1968

3,388,523
VEHICLE TRIM STRIP WITH BUMPER INSERT
James D. Evans, 11835 SW. 81st Road,
Miami, Fla. 33156
Filed May 29, 1967, Ser. No. 641,799
3 Claims. (Cl. 52—717)

ABSTRACT OF THE DISCLOSURE

The disclosed trim molding comprises a polished aluminum strip having an open ended channel whose walls carry sloping ornamental flanges. A compressibly resilient insert has a wedge-shaped component anchored in the channel by ribs which are keyed in keyways. The semi-circular projection provides a bumper which resists and attenuates shock of collision. At least one substantially rigid end cap serves as a closure and has retaining prongs projecting into auxiliary channels defined by the spaced divergent flanges.

Background of the invention

This invention relates to strip-type molding which is expressly designed to replace chromium finished molding such as is commonly used on the exterior surfaces of an automobile body, or similar vehicle surfaces, and has to do, more particularly, with corrosion resisting polished aluminum strip stock which is not only ornamental in contoured design, but is structurally novel in that it is provided with a compressibly resilient self-contained insert or bumper.

Prior art

The broad concept of providing an automobile trim or molding strip with a built-in or self-contained bumper or buffer made of compressibly resilient rubber or plastic material is old in the art to which the present invention relates. The patent to Zimmers 1,972,283 covering a finish molding employing a channel equipped with a shock absorbing cushion or bumper insert and with end members may be cited here as exemplary prior art. With a view toward advancing the art, the present invention features a specifically distinct insert which is keyed in the channel means, and decorative but useful end caps with adhesively applied assembling and retaining prongs.

Summary

Briefly summarized the improved trim strip is preferably but not necessarily made from extruded polished aluminum. It may be of any length depending on whether it is to span a door, or a wider body surface. It is characterized by a main lengthwise part which is referred to as the body portion. This body portion is channel-shaped in cross-section and has a pair of opposed channel walls whose corresponding inward edges are joined by an intervening connecting web which is adapted to be screwed in place. The outward edges of the channel walls are provided with longitudinal beads. These beads are such in construction and position that they provide keying ribs. In fact the ribs overhang the channel portion. There is an elongated rubber, plastic or equivalent insert which is commensurate in length with the length of the channel. This insert is accordingly of compressibly resilient or cushioning material and embodies opposed outwardly opening companion grooves. These grooves extend longitudinally along exterior side surfaces and transform the insert into two component portions; namely, an anchoring base which is lodged in the channel and an impact absorbing bumper portion which projects outwardly beyond the channel. The keying ribs are keyed in the grooves and thus securely retain the over-all insert in place. Flanges are featured and define auxiliary channel-ways. At least one end member called a cap is provided and has prongs which are fitted telescopically into the channel-ways for adequate retention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Description of the preferred embodiment

Figure 3:
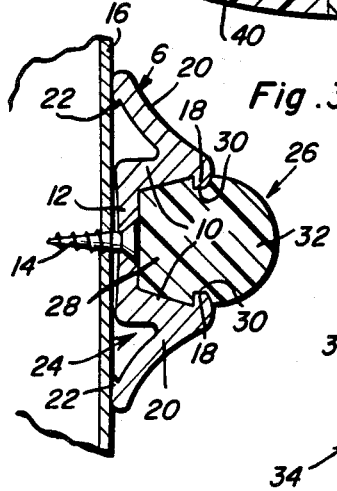
FIG. 3 is a cross-section on the vertical line 3—3 of FIG. 1.

The improved polished or finished extruded aluminum strip or molding is denoted, generally speaking, by the numeral 6. This strip embodies an elongated channel-shaped body portion denoted at 8 in FIG. 4. This strip comprises a pair of opposed side or channel walls 10 having converging surfaces and which are joined by an intervening connecting web 12. As shown in FIG. 3 this web may have a slightly concaved surface. It is also provided at suitable points with holes to accommodate the headed ends of attaching and retaining screws 14 which are screwed into the vehicle body 16. The outwardly disposed lengthwise portions of the channel walls 10 are provided with coplanar inwardly projecting overhanging beads 18 which constitute keying ribs. The channel walls are also provided on exterior sides with appropriately angled integral component parts which are here referred to as outwardly sloping or diverging flanges 20 which terminate in lip portions 22 which abut the surface of the vehicle body 16. The degree of slope of the flanges is such that they are spaced from exterior surfaces of the channel walls 10 to define substantially triangular auxiliary channels 24. Thus the web 12 and walls 10 define a main channel and the flanges 20 cooperate in defining the triangulate auxiliary channels.

Figure 1:
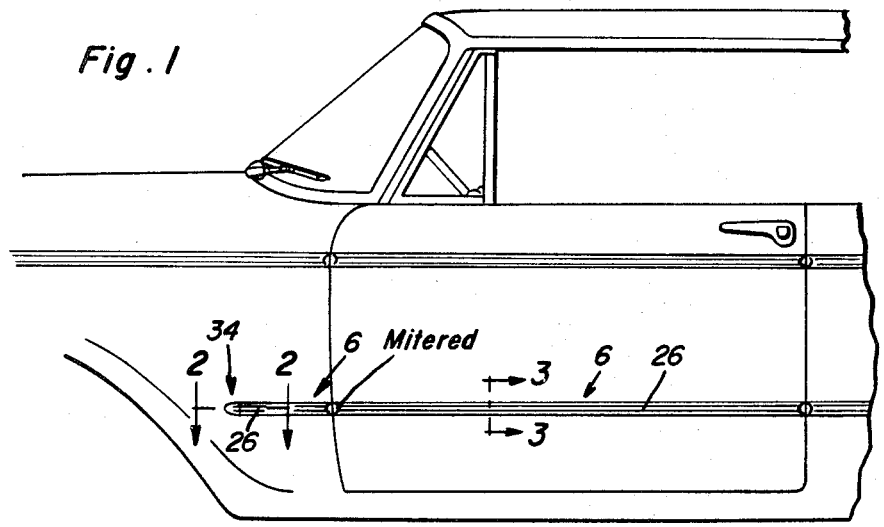
FIG. 1 is a view in side elevation showing a fragmentary portion of an automobile and showing two or more trim strips applied, one extending across the exterior surface of the door.
Figure 2:
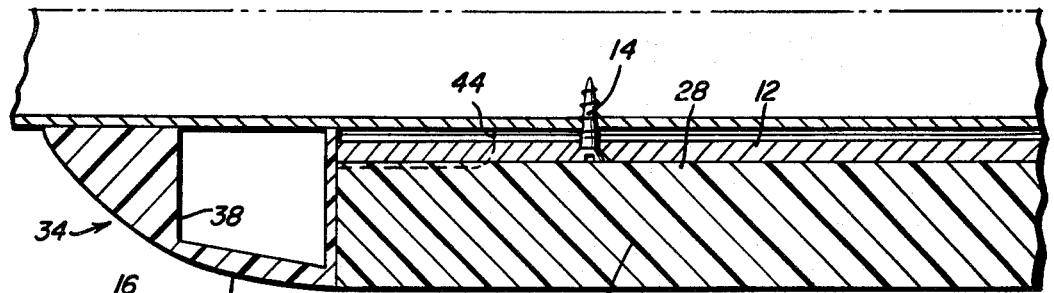
FIG. 2 is an enlarged detail section taken on the plane of the horizontal section line 2—2 of FIG. 1.
Figure 4:
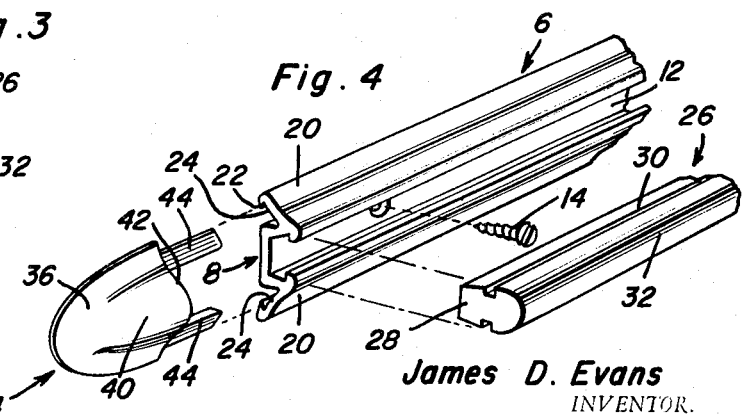
FIG. 4 is an exploded perspective view wherein all of the component parts are shown in detail and in ready-to-assemble relationship.

The companion rubber, plastic or equivalent compressibly resilient insert is donated by the numeral 26 and, as shown in FIG. 4 it has a substantially wedge-shaped component part which is denoted as an anchoring member 28 and is fittingly lodged in the main channel in such a manner that the keying ribs 18 can be fitted retentively in their respectively cooperating grooves or keyways 30. The outward half-portion of the insert is transformed in a substantially semi-circular part 32 which provides the buffer or bumper proper. Corresponding end portions of the bumper and strip are mitered as suggested in FIG. 1, and the opposite outer ends are provided with closing caps. One cap is shown as at 34 and is made of substantially hollow hard rubber or plastic material. It has the semi-ovate shape denoted at 36 and also has a hollow portion 38 (FIG. 2) and a raised portion 40. The abutment end 42 is provided with spaced parallel coplanar triangulate prongs 44 which are fitted telescopingly into the auxiliary triangular channels 24 and are bonded and retained in place (not detailed) thus effecting a suitable closure.

It is believed that the invention well serves the purposes for which it is intended and that a more detailed description is unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For attachment to an exterior surface of a substructure such as, for example, the body or door surface of an automobile: decorative strip molding comprising; a trim strip embodying an elongated body portion channel-shaped in cross-section and embodying a pair of opposed channel walls having corresponding inward edges joined by a connecting web and outward free edges provided with opposed coplanar beads constituting keying ribs and overhanging the channel between said walls, an elongated insert commensurate in length with the length of said channel, said insert being solid in cross-section and made of compressibly resilient material and having opposed outwardly opening companion grooves extending longitudinally along exterior side surfaces, said grooves providing keyways and also defining (1) an anchoring base which is lodged in the channel with said ribs keyed in said keyways and (2) an impact absorbing bumper projecting outwardly beyond the channel and ribs, surface abutting and stablilizing flanges carried by and projecting laterally from said channel walls and having inward longitudinal lip portions substantially coplanar with said web and which reside, when in use, in contact with said body surface, said channel being substantially wedge-shaped in cross-section, said anchoring base being correspondingly wedge-shaped in cross-section, said flanges flaring away from the respective channel walls and diverging from each other and being spaced from but oriented with their respectively coordinating channel walls and providing elongated auxiliary channels commensurate in length with their respectively cooperable channel walls, said auxiliary channels being open at their respective ends, and, in combination, at least one end cap designed and adapted to abut one end of the aforementioned insert, corresponding ends of said channnel walls, and also the flanges defining said auxiliary channels in a manner to block and close said auxiliary channels, said cap having assembling and retaining prongs projecting from an attachable end, and said prongs being spaced apart and telescopingly plugged into and secured in their respectively cooperable auxiliary channels.

2. The decorative strip molding defined in and accorded to claim 1 and wherein said strip is made of extruded polished aluminum, said insert is made of moldable plastic material, and said end cap is ornamentally contoured to conformingly match adjacent terminal end portions of said strip and insert, respectively, and is made of hard substantially incompressible plastic material.

3. The decorative strip molding according to claim 2, and wherein said auxiliary channels are substantially triangular in cross-section, and said prongs are also triangular in cross-section for mating application when fitted and adhesively anchored in their respectively cooperating auxiliary channels.

References Cited

UNITED STATES PATENTS

| | | |
|---|---|---|
| 3,290,082 | 12/1966 | Fritch. |
| 3,222,838 | 12/1965 | Sweeney _____ 52—717 X |
| 1,972,283 | 9/1934 | Zimmers. |
| 2,049,501 | 8/1936 | Herron. |
| 2,517,217 | 8/1950 | Laub. |
| 2,605,157 | 7/1952 | Reitzel. |
| 2,889,165 | 6/1959 | Zientara. |
| 3,003,185 | 10/1961 | Grunwald. |
| 3,270,384 | 9/1966 | Batz. |
| 3,288,512 | 11/1966 | Zientara. |

FOREIGN PATENTS

| | | |
|---|---|---|
| 1,039,729 | 5/1953 | France. |

PHILIP GOODMAN, *Primary Examiner.*